United States Patent
Peck et al.

(10) Patent No.: US 11,087,251 B2
(45) Date of Patent: Aug. 10, 2021

(54) AUTOMATICALLY CREATING DIGITAL CONTENT IN A FEDERATED APPLICATION SYSTEM BASED ON SENTIMENTS OF ELECTRONIC RESPONSES

(71) Applicant: ATLASSIAN PTY LTD, Sydney (AU)

(72) Inventors: Ryan Peck, Pflugerville, TX (US); Eric Brynsvold, Austin, TX (US); Markus Te Grotenhuis, San Francisco, CA (US)

(73) Assignee: ATLASSIAN PTY LTD., Sydney (AU)

( * ) Notice: Subject to any disclaimer, the term of this patent is extended or adjusted under 35 U.S.C. 154(b) by 512 days.

(21) Appl. No.: 15/877,594

(22) Filed: Jan. 23, 2018

(65) Prior Publication Data

US 2019/0228368 A1 Jul. 25, 2019

(51) Int. Cl.
*G06Q 10/06* (2012.01)
*H04L 29/08* (2006.01)

(52) U.S. Cl.
CPC ........... *G06Q 10/063114* (2013.01); *G06Q 10/06314* (2013.01); *G06Q 10/06316* (2013.01); *G06Q 10/063116* (2013.01); *G06Q 10/063118* (2013.01); *H04L 67/306* (2013.01)

(58) Field of Classification Search
CPC ... G06Q 10/063114; G06Q 10/063116; G06Q 10/06314

USPC ........................................................ 705/301
See application file for complete search history.

(56) References Cited

U.S. PATENT DOCUMENTS

| 2015/0039405 A1* | 2/2015 | Frank ............... H04N 21/44218 705/12 |
| 2015/0040139 A1* | 2/2015 | Frank ....................... G06F 9/46 718/105 |

* cited by examiner

*Primary Examiner* — Rokib Masud
(74) *Attorney, Agent, or Firm* — Brownstein Hyatt Farber Schreck, LLP

(57) ABSTRACT

The techniques herein include an inquiry controller determining whether timing criteria have been met for sending an inquiry to a particular user account. In response to determining that the timing criteria for sending an inquiry to the particular user account is satisfied, the inquiry is sent to and received by a particular user device associated with the particular user account. When a response is received, a response analyzer analyzes it and selects a first follow-up action, with associated first digital content, for the system to perform for the particular user account based on the analysis. The chosen action may include automatically creating a calendar item in a digital calendar associated with the user account, updating a digital task list for the user account, generating and transmitting a second inquiry to the particular user device, and the like. The follow-up action is then performed.

20 Claims, 4 Drawing Sheets

FIG. 4

| How do you feel today? | 400 |

Enter Response Here  410

Tell us about your experience with toolkit A  401

Select the feature: 411 — Toolkit feature A1 / Toolkit feature A2

Your thoughts? 412 — Great! / Not good!

AUTOMATICALLY CREATING DIGITAL CONTENT IN A FEDERATED APPLICATION SYSTEM BASED ON SENTIMENTS OF ELECTRONIC RESPONSES

FIELD OF THE INVENTION

The techniques described herein relate to automatic digital content generation, and in particular to automatically creating digital content in a federated application system based on sentiments of electronic responses.

BACKGROUND

In federated computing systems, and especially in situations where teams are working on or using those systems (such as teams developing software together), feedback is often elicited at the end of the project, with fixed questions or question types, and is sometimes done in group settings. This causes a number of issues. First, eliciting feedback and reactions only at the end of a project will naturally cause the respondents to have in the front of mind only the most recent aspects of the project. When the project is long term (e.g., weeks or months), this effect is exacerbated. Second, the fixed nature of the questions asked can be an issue. If the question and its response do not fit the situation or the way the respondent if feeling, it can cause issues with accuracy and relevancy of the responses. Third, when the questions are asked in a group setting, respondent can feel less free to respond honestly, in ways that may upset others, or in ways that may be outside the norms of the group (e.g., saying you had to work too many hours may not be a broadly accepted on certain teams). Lastly, the responses are interpreted by managers, human resources, etc., and they have to follow up with people, teams, etc. Combined together, these issues make it impossible to generate appropriate follow up digital content such as electronic documents, tasks, calendar entries, digital content, and the like since the underlying feedback is lacking.

The techniques described herein address those issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The attached claims serve as a summary of the invention.

BRIEF DESCRIPTION OF THE DRAWINGS

In the drawings:

FIG. 4 depicts example interfaces for responding to inquiries.

DETAILED DESCRIPTION

Figure 1:
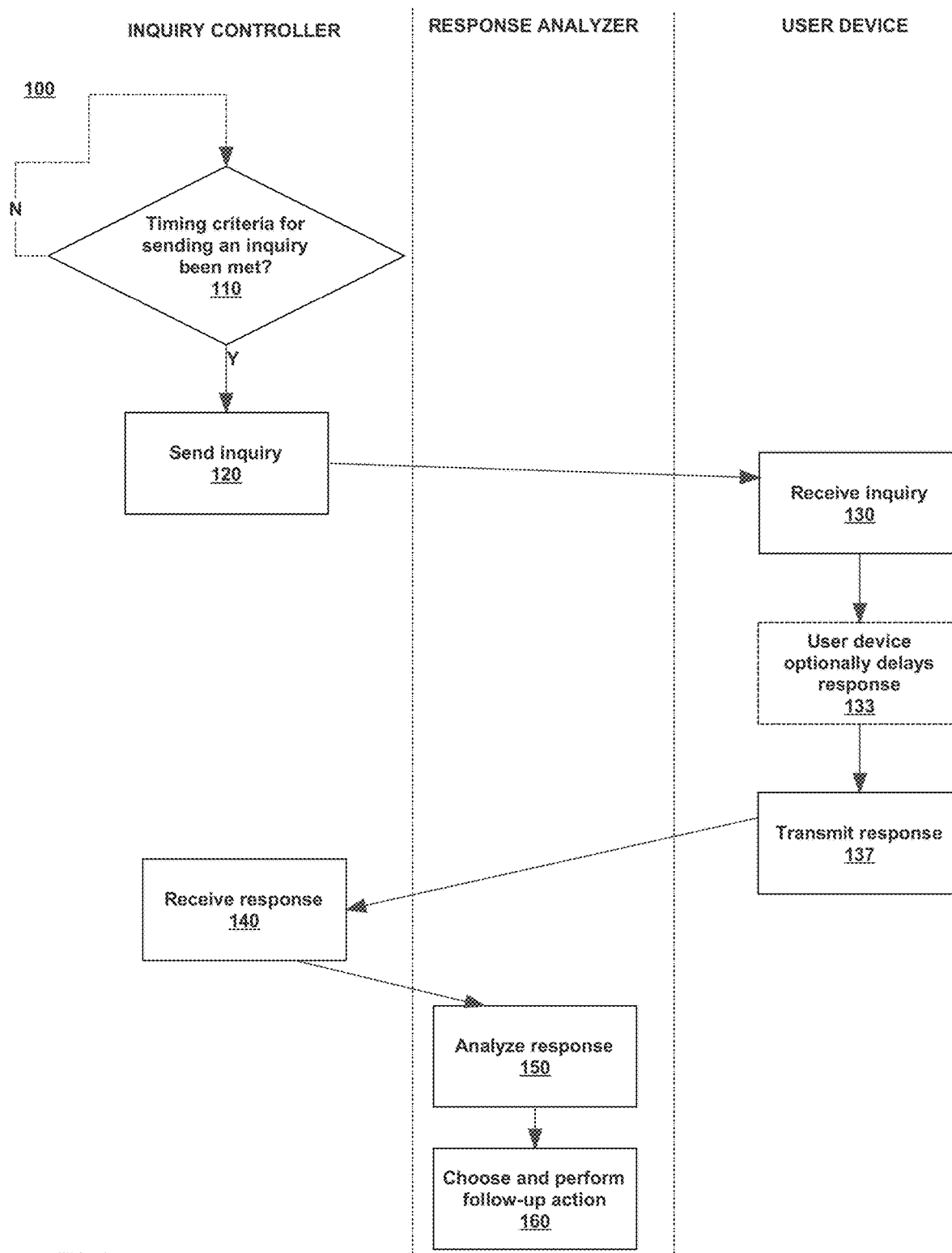
FIG. 1 depicts an example processes for automatically creating digital content in a federated application system based on sentiments of electronic responses.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Automatic generation of digital content based on sentiment of responses is an important issue for electronic systems, including federated systems. Consider, for example, a team of engineers working on a project. Having that team function properly involves knowing how the team is currently functioning and doing what is possible to improve that functioning. Traditionally, a manager may walk around the office to get input from people on how they are functioning (e.g., positive or negative sentiment), what is working and what is not, and the like. The issue with this approach is that it takes an incredible amount of the manager's time and effort, and relies on the expertise of that manager. If a company is advanced, they may even have the team submit evaluations at the end of projects in order to get a better picture of how the operation went. Reading all of these forms would still take time, and would not allow for any changes to be made during the project, since the forms are submitted at the end of the project.

Techniques herein address these issues.

Using the techniques herein, inquiries are sent to user devices/accounts (e.g., associated with a user who might be a member of a team). These inquiries may be open ended (e.g., free text) and allow for responses that encompass a number of issues and allow for responses of various sentiments (e.g., positive, negative, neutral). Once a response is received from the user device/account, a response analyzer may analyze the response to get the sentiment from the response. The response analyzer may also associate the response with something based on the analysis, such as a particular project, a particular feature, a particular aspect of the team, etc.

Based on the analysis of the response, the response analyzer may choose and perform a follow-up action, including generated digital content for the follow-up action. For example, if the sentiment is negative for a response, the response analyzer may create a calendar entry in a digital calendar associated with the responding user account. That calendar entry may have associated digital content that indicates the nature of the meeting being scheduled—to discuss the negative view of the user of the project, and the meeting may be scheduled with the manager of the user associated with the user account. As another example, the follow-up action may be to update a digital task list for the user account. For example, if the user has a negative or overwhelmed sentiment, the task list may be updated to reduce the number of tasks assigned to the user. If the user has a positive sentiment related to a particular task or project, the digital task list may be updated to add more and/or related tasks or projects (and possibly take other tasks off of the user account's task list). In some embodiments, the follow-up action may be another inquiry, and it may be generated and sent to the user as a follow up to the first response. For example, if the response analyzer detects a negative sentiment, then a follow up inquiry may be sent to get more information about what caused the negative sentiment. Numerous other examples of follow-up actions and associated digital content are discussed herein.

Example Processes for Automatically Creating Digital Content in a Federated Application System Based on Sentiments of Electronic Responses FIG. 1 depicts a process 100 for automatically creating digital content in a federated application system based on sentiments of electronic responses. The process 100 begins by the inquiry controller determining whether timing criteria have been met 110 for sending an inquiry to a user account. The criteria may include numerous factors, as discussed herein. If the criteria have been met 110, then the inquiry is sent 120. A user device receives 130 the inquiry. In some embodiments, the user device can be used to delay 133 the response. For example, a user using the user device, and associated with the user account to which the inquiry was sent, can elect to delay response. Once the user responds and that response is transmitted 137 to the user inquiry controller, which receives 140 the response. The inquiry controller then passes the response to the response analyzer, which analyzes 150 the response, and chooses and performs 160 a follow-up action based on the response.

Returning again to the top of process 100, the inquiry controller determines whether timing criteria for sending an inquiry to a user account have been met 110. The criteria may include numerous factors. In some embodiments, there may be integration with a calendar application for the user account. The calendar integration may allow the techniques herein to use the occurrence of calendar events as timing criteria for sending an inquiry to a user account. For example, if a user has just had a group meeting on a particular project (as indicated by a calendar entry with multiple project participants, and/or with the project name in the title or description), then the inquiry controller could determine that the timing criteria have been met 110 by determining that the meeting with project participants has ended. In some embodiments, the calendar entry may indicate that a project has completed (e.g., by matching project completion keywords, such as "recap", "debrief", etc.), and the completion of that calendar entry may indicate that the timing criteria have been met 110. Once that meeting has been completed, then the user account associated with the calendar entry may be sent an inquiry about the project. In some embodiments with calendar integration, the criteria may be met when there are other types of meetings: one-on-ones (e.g., by matching that there are just 2 participants), weekly or monthly sync meetings (e.g., by matching the recurrence of the meeting and/or matching the title or description as "sync", "weekly", "monthly", the project name, etc.), and the like.

For example, timing criteria could be met 110 when an action or event occurs with respect to a previous response or event. For example, if a user account had previously been associated with a response of a particular sentiment (e.g., positive or negative), then a follow up to that previous response may warranted. As such, when a next milestone for that event or action is met, the timing criteria may be met 110. Taking the example further, if the user associated with the user account had previously expressed a negative (or positive) sentiment after an interaction, project, or task of a particular type, or associated with a particular system, user, location, event type, device or device type, etc., then when a calendar entry indicates a similar or related event or interaction, then once a related calendar entry is completed, the timing criteria may be met 110.

In some embodiments, the timing criteria may be related to a previous event, interaction, or the like (e.g., regardless of any sentiment previously expressed). For example, each time a user closes a ticket (when a project is completed) in a ticket or issue management system, then the timing criteria may be met 110. As another example, when a subsequent calendar event (or other type of discernable interaction such as a meeting, email exchange or the like) occurs related to the previous event, interaction, etc. occurs, then the timing criteria may be met 110. For example, the timing criteria may be associated with the occurrence of events associated with a particular project, such as sync meetings. As such, an inquiry timing may be met after each sync meeting. Timing criteria may be met 110 at some interval related to the ongoing project. For example, the timing may be met once the project is complete (also discussed elsewhere herein), once a week while the project is active and the timing may be met to send inquiries to team members each week, month, after every sync meeting (e.g., as detected by text matching in the calendar invite), after each 1:1 related to the project (e.g., similarly detected), randomly among meetings, after each (or some subset) of code check-ins, after each time (or a subset of times) that shared documents have been created or modified, and the like. Relatedly, in embodiments with email integration, when an email arrives about a particular project (e.g., if the project name is detected in the email), the timing criteria may be met 110.

In some embodiments, timing criteria may be related to responses from other, related user accounts. For example, the timing criteria may be met 110 when one or more other user accounts associated with a project (or otherwise associated with a user account) have responded to an inquiry. For example, if there are 5 members or a team, when one member (or more) of the team has responded to an inquiry related to the team and/or a project the team is working on, then the timing to send an inquiry to other team members may also be met 110.

In each of the above-discussed determined meeting 110 of criteria, the time of day may also be one of the criteria. For example, inquiries might only be sent at the beginning or end of the day (local time), when a user opens one of the applications running on the federated system, etc. As such, if other criteria have been met (e.g., the end of a 1:1, team sync, etc.), the inquiry timing may not be met until the end of the day of those criteria, the beginning of the next day after the other criteria are met, or the like.

In some embodiments, geographical data of the user device may be used as criteria. For example, an inquiry may be held (the timing not met 110) until the user leaves a particular meeting, the office, etc. as indicated by geofence data.

In some embodiments, a user account can request an inquiry be sent to the user account. For example, the user account could select a setting, press a button on a webpage or in one of the federated applications, or the like. That action may indicate that the timing has been met 110. Relatedly, in some embodiments (not depicted in FIG. 1) a user account can respond to a question of its own volition without first requesting that the inquiry be sent to the user. For example, a user may log into his or her user account, and, from there, find (e.g., on a webpage or in a page in a user application) an inquiry to which to response (e.g., on a web page), and send a response to that inquiry. That inquiry may be available to that user (e.g., as part of a project, job, etc.) for response at any time. Once the response is received, the inquiry controller could receive 140 the response.

If the criteria have been met 110, then the inquiry is sent 120, and the user device receives 130 the inquiry. The technology and protocols used to transmit the inquiry may be any appropriate set, and the communication will typically be transmitted using a methodology agreeable or usable to by the sender (e.g., the inquiry control 230 of FIG. 2) and recipient (e.g., user device 220). The communication protocol can include a variety of technologies, including FTP (/S), e-mail, HTTP(/S), SSL, SSH, TCP/IP, etc. In some embodiments, for example, the inquiry controller 230 may send the message via SSH to a user account via a federated application, possibly running on or as part of a shared resource 250. The user account may be active on a user device 220, which is in turn coupled to the shared resource 250 via network 290. For example, if the user account is active on an email application running on device 220, which is in turn connected to an email server running on shared resource 250, then the inquiry control may send the inquiry directly to the user device 220 or to the user device 220 via the email server running on the shared resource 250.

In some embodiments, the user device 220 can delay 133 the response. For example, a user account active on the user device 220, and to which the inquiry was sent, can elect to delay response. In some embodiments, when the user device gets the inquiry, it will provide a button or selectable element allowing delay 133 of the response. The button or selectable element may indicate or allow selection or a particular time period for the delay 113. For example, the button may say "delay for 1 day" or may have a numeric text box allowing the user to type in the number of days or hours to delay 133. In some embodiments, the user device may allow the user device to "ignore" or "close" a notification or otherwise indicate that there is no current response to the inquiry. This may have the effect of delaying 133 the inquiry as it may then be resent 120 or otherwise resurface on the user device for the user account at a later time (e.g., after 1 hour, day, week, until the end of day, until the beginning of the next business day, etc.).

In some embodiments, if the user account is associated with a status or state in which it is not to be disturbed, the inquiry may be delayed 133. For example, if the user account is associated with a meeting in a federated calendar application, has set a "do not disturb" status in a federated application, or the like, then the inquiry may be delayed 113. The delay may be until the meeting ends or status changes, or may be for a fixed period of time (e.g., 1 hour, day, week, until the end of day, until the beginning of the next business day, etc.).

In some embodiments, if the user device can detect that a user associated with the user account is engaged in another activity, then the inquiry may be delayed 133. For example, if the user device can detect that the user is working on a document, working on tasks in a task list, on a video or audio call, or otherwise engaged, the inquiry may be delayed 133 for a fixed time or until the user device detects that the user is no longer engaged in that task.

In some embodiments, an inquiry may be delayed 133 multiple times for any of the reasons and/or in any of the ways described herein. Further, in some embodiments, there is no limit on the number of times that an inquiry can be delayed 133. In some embodiments, there is a limit on the number of times that an inquiry can be delayed 133. When that limit is hit, the user device will no longer be able to delay 133 the response.

Once the user responds to the user inquiry via the user device, it is transmitted 137 back to the inquiry controller, which receives 140 the response. The same mechanism, devices, protocols, and technology may be used to transmit 137 the response and receive 140 the response as discussed elsewhere herein, including with reference to sending 120 and receiving 130.

The inquiry control then passes the response to the response analyzer, which analyzes 150 the response. In some embodiments, the response may include a free-text response recorded or typed at the user device. For example, FIG. 4 depicts an example interface 400 that has a text box 410 to allow free-form text responses to inquiries. In such embodiments, there may be sentiment analysis performed on the response. In some embodiments, the response analyzer 210 uses keyword matching to analyze the response received. For example, the sentiment of the response can be determined using matching keywords for positive words (e.g., "great", "nice", "positive", "excellent", "enjoyable", "useful", etc.) and/or negative words (e.g., "bad", "negative", "unacceptable", "painful", "boring", etc.). In some embodiments, the response analyzer 210 matches positive and negative keywords and makes a determination of whether the response is positive or negative based at least in part on the balance of positive and negative keywords. For example, the response analyzer 210 may perform sentiment analysis as a binary Classification task, where each word in the response is given a score that is positive (1), negative (0), or ignored. The sentiment may then be a function of that positive and negative classification (e.g., an average of the scores where, if the average is above some threshold, such as 0.50, then the response is considered positive).

In some embodiments, the response analyzer 210 uses supervised machine learning to analyze 150 the sentiment of the response. With supervised machine learning, training data has text (e.g., of previous responses) with sentiment valences (e.g., positive, negative, and possibly neutral). A neural network is trained with the training data. Subsequently, the response analyzer 210 can use the trained neural network to determine sentiment of the response. In some embodiments, if a mistake or error is noted in the determination of sentiment (e.g., a response is given a negative or positive sentiment by the response analyzer 210, and a human operator later determines that the determined sentiment was incorrect), the response analyzer 210 may add the response and the corrected sentiment to the training data. This will allow the neural network to be retrained and correct the previous error.

Numerous types of machine learning algorithms may be used to create sentiment classifiers. In some embodiments, a multinomial naive Bayes is used. With a multinomial event model, samples (feature vectors) represent the frequencies with which certain events have been generated by a multinomial (P1 . . . Pn) where Pi is the probability that an event i occurs. A feature vector X={X1 . . . Xi} with Xi representing the number of times event i was observed in a particular instance. The likelihood of observing X for each of K possible outcomes or classes Ck is given by:

$$p(x \mid C_k) = \frac{(\sum_i x_i)!}{\prod_i x_i!} \prod_i p_{ki}^{x_i}$$

In some embodiments, the classes Ck may be positive sentiment and negative sentiment (and possible neutral sentiment as a third class.). The multinomial naive Bayesian classifier may use a count of words for the incoming training set as well as the response to classify. For example, if a phrase in the training set is "The project was frustrating because of the constant scope changes", then the phrase may be associated with the vector {"the", 2; "project", 1; "was", 1; "frustrating", 1; etc.}. In some embodiments, pronouns and other common words known to not be associated with sentiment may be exclude. For example, "the" and "was" may both be excluded from the vector. The vector may then be used to train the multinomial naive Bayesian classifier.

In some embodiments, once the multinomial naive Bayesian classifier is trained, then the following example summation may be used to determine the multinomial naive Bayesian classifier:

```
FOR (each word W in incoming response)
  If W is a "stop word", then // skip ...
  Else
    FOR each classification C:
      CandidateScore(C) += loglikelihood(W, C)
    ENDFOR
ENDFOR
Return C associated with highest CandidateScore(C)
```

Numerous other ways to train and determine the classifications using a multinomial naive Bayesian classifier are also possible. For example, depending on implementation, if a word has not occurred in the training set, then the loglikelihood(W, C) could be "zero." As such, one could first test to see if a particular word in the incoming response (W) is in the corpus of words in the training set ("V"). The "IF" statement in the above could then be altered. For example:

```
FOR (each word W in incoming response)
  If W is a "stop word" or W not in V, then //skip ...
  Else
    FOR each classification C:
      CandidateScore(C) += loglikelihood(W, C)
    ENDFOR
ENDFOR
Return C associated with highest CandidateScore(C)
```

In some embodiments, a multinomial logistic regression is used. Multinomial logistic regression extends standard logistic regression to multiple possible discrete outcomes. In some embodiments, out possible discrete outcomes are positive sentiment and negative sentiment (and possible neutral sentiment as a third possible outcome). In some embodiments, the classification of sentiment is accomplished with perceptrons, support-vector machines (SVMs), random forests, and/or other types of neural networks, including convolutional neural networks.

Regardless of the type of classifier used, the training data may have numerous examples of each sentiment. Below is a table of some examples of positive sentiment, negative sentiment, and neutral sentiment responses. For clarity, the responses have been limited to single sentence responses, but techniques described herein apply to and can be used with longer (or shorter) responses:

| Sentiment | Response from Training set |
| --- | --- |
| Positive | The project was well run. |
| Negative | The meeting did not resolve any open issues |
| Positive | The project was fun |
| Negative | The project was frustrating because of the constant scope changes |
| Neutral | I did not attend the meeting |
| Positive | The new feature works great |
| Negative | The new feature is broken |

After training the neural network, the response analyzer 210 analyzes 150 incoming responses, such as the following:

| Incoming response | Determined sentiment |
| --- | --- |
| The meeting felt broken | Negative |
| The new feature is frustrating | Negative |
| I was not on the project | Neutral |
| The meeting went great | Positive |
| The meeting was fun | Positive |

In some embodiments, a user account can include labels to indicate the subject of the response ("#ProjectAlpha is awesome!", where "#ProjectAlpha" is a label). Additionally, in some embodiments, the neural network can also be trained to determine the subject of the response. For example, consider a situation in which a team is developing a new software product (the "project") using a new underlying tool (the "tool" or "toolkit") and the team just had a team meeting. The neural network may be trained to determine what a response is directed toward in addition to sentiment. An example training set is given below:

| Sentiment | Subject | Response from Training set |
| --- | --- | --- |
| Positive | Project | The project was well run. |
| Negative | Meeting | The meeting did not resolve any open issues |
| Positive | Project | The project was fun |
| Negative | Project | The project was frustrating because of the constant scope changes |
| Neutral | Meeting | I did not attend the meeting |
| Positive | Toolkit | The new feature works great |
| Negative | Toolkit | The new feature is broken |

Upon analyzing 150 incoming responses the response analyzer 210 may make a determination of both the sentiment and the subject of the sentiment:

| Incoming response | Determined subject | Determined sentiment |
| --- | --- | --- |
| The meeting felt broken | Meeting | Negative |
| The new feature is frustrating | Toolkit | Negative |
| I was not on the project | Project | Neutral |
| The meeting went great | Meeting | Positive |
| The meeting was fun | Meeting | Positive |

In some embodiments, the response may include a fixed-form selection or response. FIG. 4 depicts an example interface 401 for allowing user account responses to fixed-form questions. Control 411 provides selection from a drop-down list of toolkit features, and control 412 provides selection from a drop-down list of sentiments, both positive "Great!" and negative "Not good!" As another example (not depicted in FIG. 4), the response may have an indicate of sentiment from a slider (e.g., happy to sad), a numeric scale (e.g., zero/sad to five/happy), a binary scale (e.g. happy or sad), or the like. Further, in some embodiments, the response may include multiple fixed-form indicators, one for each of multiple characteristics. Returning to the example above, there could be a slider indicating sentiment for each of project, team, and new toolkit. The fixed-form responses may have known subjects of the inquiry and/or sentiment valences associated with responses. As such, there may not be a need for the response analyzer to use the trained neural network to determine the subject and/or valence of the response. Instead, the valence and/or subject of the response may be determined directly from the inquiry and fixed-form response. As a specific example, if the inquiry asked "Please rate from 1 (Poor) to 5 (Great), how well you feel the new toolkit performed", then a response of "5" may be associated with a positive sentiment for the toolkit, a "1" with a negative sentiment for the toolkit, and "3" with a neutral sentiment for the toolkit.

Based on the analysis 150 of the response, the response analyzer 210 chooses and performs 160 a follow-up action with associated digital content based on the response. The choice of response may be based on the sentiment and/or the subject of the response. Numerous embodiments and examples are given herein. As a general overview, the subject of the response may indicate that follow-up related to that subject is needed. The indication of whether the sentiment is positive or negative may cause a choice of follow-up action to continue a positive sentiment or counter a negative sentiment.

In some embodiments, the follow-up action is to automatically create a calendar item in a digital calendar associated with the user account that sent the response. For example, if the response expresses a negative sentiment, a 1:1 meeting may be scheduled with the user account associated with the manager of the user associated with the user account that sent the response. In some embodiments, if the analysis of the response indicates that the response is related to a project, then a digital calendar entry may be created for the entire project team, the project lead, etc. If a response is related to a particular product or feature, then a digital calendar could be created with an account of a representative of that product.

In some embodiments, an existing digital calendar entry may be modified as part of choosing and performing 160 the follow-up action. For example, if the response relates to a negative sentiment about a project (or even a positive sentiment about a project), then an agenda item may be added to a digital calendar entry for an existing sync meeting for that project. Similarly, agenda items could be added to existing meetings with managers, etc. In some embodiments, if the response is related to a particular product or product feature, then the user account may be added an existing "office hours" with a representative of that team and/or an item may be added to a digital agenda for that meeting. In some embodiments, if the response is negative and is related to a particular feature, then a digital "bug fix" ticket may be added a bug-tracking or ticket-tracking system.

In some embodiments, the response analyzer 210 may choose and perform 160 an update to a digital task list associated with a user account. For example, if a user account sends a response with a positive sentiment for a particular project or tasks (e.g., as recognized by the response analyzer 210: "Project Alpha was fun") may assign more tasks or projects related to that task or project to the user account. If a user account sends a response with a negative sentiment related to a particular project or task, the digital task list may be updated to replace related tasks or projects related to the task or project with which the negative sentiment was associated. For example, if a user account sends a response that indicates "Monday's bug fix task for Project Alpha was painful because I have never worked on Project Alpha", then the response analyzer 210 may remove future bug-fixing tasks for Project Alpha from the digital task list of the user account.

In some embodiments, a response analyzer 210 may choose and perform 160 a follow-up (second) inquiry. The second inquiry may be sent to the user account in the manner described elsewhere herein. The second inquiry may include fixed-form questions and responses, free text, and/or the like. In some embodiments, the second inquiry is chosen based on the content of the first response. As an example, if the first response is related to a particular project, task, team, tool, etc., then the follow-up inquiry may include further inquiries about that particular project, task, team, or tool. If the first response indicated "the new ticket-management system is broken", a follow-up inquiry could be sent to the user account with a mix of fixed form and free text inquiries, such as "What version of the ticket-management system are you using", "Were you unable to log in", "Were you unable to create a new ticket", "Were you unable to update an existing ticket", and the like. The follow-up or second inquiry can then be sent to the user device, and the process 100 may be performed related to the response to follow-up inquiry.

Relatedly, in some embodiments, responses for the same task, project, team, project, etc. are received over time and analysis is performed on the sequence of responses related to that task, project, team, project, etc. For example, if a user account responds related to a particular project multiple times, those responses can be analyzed to find trends in the sentiment for the user account for that project over time. This information may then be used to choose and perform 160 a follow-up action.

In some embodiments, if a response for one user account of a group (e.g., a team) has been received, and the analysis indicates that similar responses from other members of the group have been received, then the follow-up action chosen and performed 160 may be sending digital content to that user account, indicating that other accounts have responded similarly the same way. Example digital content may read: "Don't worry, you are not alone in feeling this way about Project Alpha." Additionally, or instead, the chosen and performed 160 follow-up action may be to send a manager account associated with the group a digital report on the sentiment of the team (e.g., a "weather report" on team sentiment). As another example, if a group of user accounts have all responded positively about a particular project or event, that might be highlighted (either to that group or publicly). For example, if the user accounts associated with a project have responded positively, positive digital content such as "Sounds like things are going well—keep it up!" could be posted to a digital board or digital "room" associated with that team or project.

In some embodiments, responses about a subject (task, project, team, project, etc.) may be received before and after some salient or critical event. The responses can then be analyzed in order to see the effect of the salient or critical event. For example, if responses are received related to a toolkit before and after a new version is released, then the responses can be analyzed in order to see whether the new product release had any effect on the sentiment related to the toolkit. Further, follow-up actions can be chosen and performed based on that analysis. For example, if a new product release has resulted in more negative sentiment responses, then a digital calendar entry may be set up for the product team's user accounts with a digital agenda item included to review the increase in negative sentiment. Further, the agenda may include each negative response as an agenda item, a summary of the responses received, a summary of the sentiment before and/or after the new product release, and/or the like.

In some embodiments, when the response is associated with a negative sentiment, digital content associated with positive sentiment is sent to and/or displayed for the user account as part of choosing and performing 160 the follow-up action. For example, if a response have a negative sentiment is interpreted from analyzing a response such as "I am feeling overworked", then the user account may be sent digital content such as a previously-viewed (or new) article associated with positive sentiment, a digital task list may be updated to add a task that the user account has previously indicated positive sentiment with (e.g., in addition to removing other tasks from the digital task list), a digital coupon may be sent to the user account, and/or the like. In some embodiments, the follow-up action and digital content may be personalized to the user account. For example, machine learning (e.g., such as that described herein) may be used to classify various digital content options as being associated with positive or negative sentiment for that user account, and a follow-up action associated with positive sentiment for that user account many be chosen. For example, if a user account has indicated positive sentiment for items on a task list associated with "User Callbacks", with "Coffee", and "Team Summits", then follow-up actions may be chosen associated with one or more of those things.

In some embodiments, multiple user accounts may have responded related to a particular task, project, team, project, etc. The multiple user accounts may have all responded and indicated the particular task, project, team, project, etc. or may have been sent inquiries related to the particular task, project, team, project, etc. The sentiment for the group may be analyzed together and a follow-up action for one or all of those user accounts may be set. For example, if user accounts associated with a project team have responded to inquiries with information about the project, then the team's user accounts may have a digital calendar item set up (together) to discuss the project. The digital calendar item may include agenda items indicating the project, a summary of the group sentiment, the change in group sentiment on the project over time, etc. In some embodiments, if a group has expressed negative sentiment about a project or workload, then a digital task list may be updated to reduce workload, related tasks may be removed from the digital task list, and/or tasks associated with positive sentiment may be added to the digital task list. In some embodiments, an account associated with a moderator may be added to a group meeting. The moderator account could be associated with a manager of the group, someone uninvolved in the project, someone who did not express any sentiment about the project, and/or someone that expressed a positive sentiment about the project.

Numerous additional embodiments exist. For example, the response analyzer 210 may also analyze multiple responses received from the same user account to detect patterns over time to find patterns (e.g., the user account had been associated with a positive sentiment for an extended time, and is now associated with a negative sentiment). A follow-up action may then be chosen related to declining sentiment, such as a digital calendar entry for a 1:1 with the management account (as discussed elsewhere herein).

Figure 2:
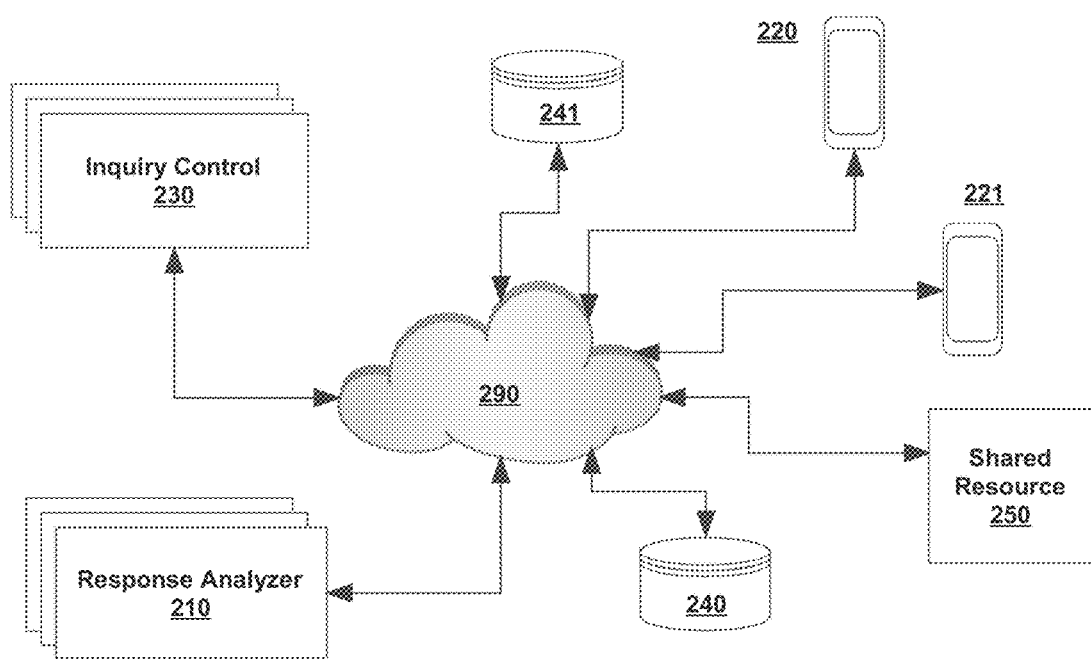
FIG. 2 depicts an example system for automatically creating digital content in a federated application system based on sentiments of electronic responses.

System for Automatically Creating Digital Content in A Federated Application System Based on Sentiments of Electronic Responses FIG. 2 depicts additional example systems for automatically creating digital content in a federated application system based on sentiments of electronic responses. An inquiry control 230, response analyzer 210, devices 220 and 221, shared resource 250, and storage mechanism 240 and 241 may all be coupled to a network 290 and be able to communicate via the network. Each of the devices 220 and 221, inquiry control 230, shared resource 250, and response analyzer 210 may run as part of the same process and/or on the same hardware (not depicted in FIG. 2), or may run separately. Further, each may run on a single processor or computing device or on multiple computing devices, such as those discussed with respect to FIG. 3 and elsewhere herein.

As discussed elsewhere herein, a response analyzer 210 may, after determining that timing criteria have been met, send an inquiry to a device 220 or 221. The device 220 or 221 may response (possibly after a delay). The response analyzer 210 may analyze the response from the device 220 or 221. Based on the analysis, the response analyzer 210 may chose or create a follow-up action with associated digital content. Numerous examples are given throughout herein, and as one example, the response analyzer 210 may create a calendar entry (e.g., on a calendar application running on a federated application such as a calendar application running on shared resource 250). That calendar entry may have digital content indicated a follow-up 1:1 meeting between the user associated with the response and the manager of the user associated with the response.

Shared resource 250 or other servers (not pictured here) may run federated applications on which follow-up actions (with associated digital content) may be performed. Federated application may include, but are not limited to, one or more of email servers or applications, chat servers or applications, help ticket systems, video conferencing systems, resource control systems (e.g., a conference room booking system), blogging services, video content services (e.g., to show stored videos), and the like.

As discussed herein the process 100 may run in single or multiple instances, and run in parallel, in conjunction, together, or one process 100 may be a subprocess of another process 100. Further, any of the processes discussed herein, including process 100 may run on the systems or hardware discussed herein, including those depicted in FIG. 2 and FIG. 3.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
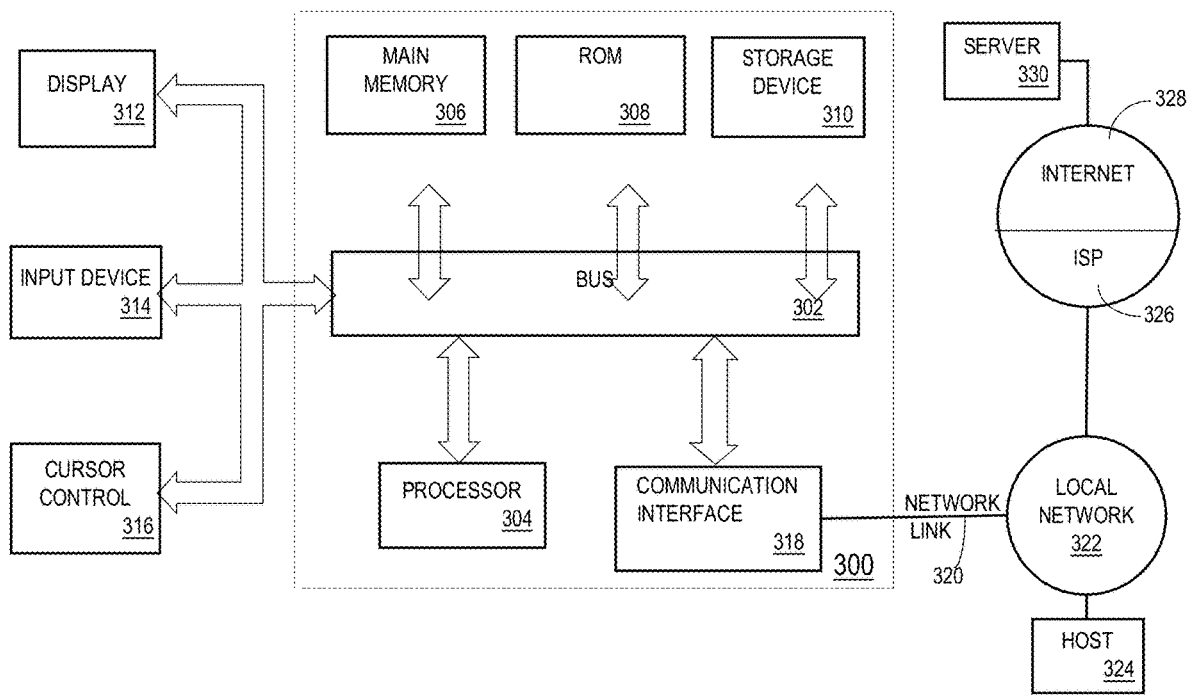
FIG. 3 depicts example hardware for automatically creating digital content in a federated application system based on sentiments of electronic responses.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:

determining, at an inquiry controller in a federated system comprising a plurality of computer program applications, whether timing criteria have been met for sending an inquiry to a particular user account, the inquiry controller executing using one or more computing devices and programmed to execute inquiry control computer program instructions, wherein the inquiry controller is communicatively coupled to a particular user device associated with the particular user account;

in response to determining that the timing criteria is satisfied, transmitting the inquiry to the particular user device by the one or more computing devices;

receiving a response to the inquiry from the particular user device and in response, analyzing, using a response analyzer in the federated system, the response to the inquiry and selecting a first follow-up action, with associated first digital content, for the federated system to perform for the particular user account based on the analyzing, from among a plurality of different follow-up actions, each of the follow-up actions being executed by one or more of the computer program applications in the federated system and comprising one or more of:

automatically creating a calendar item in a digital calendar associated with the particular user account;

updating a digital task list for the particular user account; and generating and transmitting a second inquiry to the particular user device, the second inquiry is based at least in part on the response;

wherein the response analyzer executes using one or more computing devices and is programmed to execute response analysis computer program instructions;

performing, at the federated system, the first follow-up action using the first digital content in response to choosing the first follow-up action for the federated system to perform for the particular user account;

sending, using the inquiry controller, inquiries to one or more other user devices associated with one or more other user accounts;

receiving responses to the inquiries sent to the one or more other user devices;

analyzing, using the response analyzer, the responses from the particular user device and the one or more other user devices;

determining a group-based follow-up action, with associated group digital content, for the system to perform for a group containing the particular user account and the one or more other user accounts and performing the group-based follow-up action;

determining a group sentiment for the particular user account and the one or more other user accounts;

determining the group-based follow-up action, with associated group digital content, for the system to perform for the group containing the particular user account and the one or more other user accounts based on the group sentiment, wherein the method is performed on the one or more computing devices, wherein the method is performed on the one or more computing devices.

2. The method of claim 1, wherein analyzing the response comprises determining, using the response analyzer, a sentiment of the response.

3. The method of claim 2, further comprising:

in response to determining a negative sentiment for the response from the particular user device, determining a follow-up inquiry, with follow-up digital content, to send to the particular user device;

receiving a response to the follow-up inquiry from the particular user device;

determining and selecting a second follow-up action, with second follow-up digital content, for the system to perform based at least in part on the response to the follow-up inquiry.

4. The method of claim 2, further comprising:

in response to determining a negative sentiment of the response from the particular user account, transmitting digital content to the particular user account determined to be associated with positive sentiment.

5. The method of claim 2, further comprising:

in response to determining a negative sentiment of the response from the particular user account, updating a digital task list for the particular user account to remove a digital task item.

6. The method of claim 1, further comprising determining, at the inquiry controller, whether timing criteria have been met for sending the inquiry to the particular user account based at least in part on a calendar entry for the particular user account.

7. The method of claim 1, further comprising determining, at the inquiry controller, whether timing criteria have been met for sending the inquiry to the particular user account based at least in part on time of day for the particular user account.

8. The method of claim 1, further comprising determining, at the inquiry controller, whether timing criteria have been met for sending the inquiry to the particular user account based at least in part on completion of a project associated with the inquiry.

9. The method of claim 1, further comprising determining, at the inquiry controller, whether timing criteria have been met for sending the inquiry to the particular user account based at least in part on receiving responses to related inquiries from other users of a group associated with the particular user account.

10. The method of claim 1, further comprising determining, at the inquiry controller, whether timing criteria have been met for sending the inquiry to the particular user account based at least in part on a request for inquiry from the particular user account.

11. The method of claim 1, further comprising determining, at the inquiry controller, whether timing criteria have been met for sending the inquiry to the particular user account based at least in part on whether a delay criterion previously indicated from the particular user account has been met.

12. The method of claim 1, further comprising determining, at the inquiry controller, whether timing criteria have been met for sending the inquiry to the particular user account based at least in part on whether a status for the particular user account in an online system indicates that the particular user account accepts inquiries.

13. The method of claim 1, wherein the inquiry sent to the particular user device is associated with a particular ongoing interaction, the method further comprising:

sending a second inquiry related to the particular ongoing interaction to the particular user device;

receiving a second response related to the second inquiry from the particular user device;

analyzing, using the response analyzer, the second response and determining a trajectory of reactions for the particular user account based on the analyses of the response and the second response;

determining a second follow-up action, with associated second digital content, for the system to perform for the particular user account based at least in part on the trajectory of reactions.

14. The method of claim 1, further comprising:
determining that the response is associated with a feature of a user system used by the particular user account;
choosing the first follow-up action for the system to perform based at least in part on the feature of the user system.

15. One or more non-transitory storage media storing instructions which, when executed by one or more computing devices, cause performance of the method recited in claim 1.

16. A system comprising:
an inquiry controller in a federated system comprising a plurality of computer program applications communicatively coupled to a particular user device for a particular user account, the inquiry controller executing using one or more computing devices and programmed to execute inquiry control computer program instructions;
a response analyzer communicatively coupled to the inquiry controller, the response analyzer executing using one or more computing devices and programmed to execute response analyzer computer program instructions;
the inquiry controller configured to determine whether timing criteria have been met for sending an inquiry to the particular user account;
in response to determining that the timing criteria for sending an inquiry to the particular user account is satisfied, transmit the inquiry to the particular user device by the one or more computing devices;
receive a response to the inquiry from the particular user device;
send the response to the response analyzer;
the response analyzer being configured to: analyze the response to the inquiry;
determine a group sentiment for the particular user account and one or more other user accounts;
determine a group-based follow-up action, with associated group digital content, for the system to perform for a group containing the particular user account and the one or more other user accounts based on the group sentiment;
select a first follow-up action, with associated first digital content, for the federated system to perform for the particular user account based on the analysis, from among a plurality of different follow-up actions, each of the follow-up actions being executed by one or more of the computer program applications in the federated system, each of the follow-up actions comprising one or more of: automatically creating a calendar item in a digital calendar associated with the particular user account, updating a digital task list for the particular user account, generating and transmitting a second inquiry to the particular user device, wherein the second inquiry is based at least in part on the response, the response analyzer executing using one or more computing devices and programmed to execute response analysis computer program instructions; and
perform the first follow-up action using the first digital content in response to choosing the first follow-up action for the federated system to perform for the particular user account.

17. The system of claim 16, wherein analyzing the response comprises determining, using the response analyzer, a sentiment of the response, and the response analyzer being further configured to: in response to determining a negative sentiment for the response from the particular user device, determining a follow-up inquiry, with follow-up digital content, to send to the particular user device;
receiving a response to the follow-up inquiry from the particular user device;
determining and selecting a second follow-up action, with second follow-up digital content, for the system to perform based at least in part on the response to the follow-up inquiry.

18. The system of claim 16, wherein analyzing the response comprises determining, using the response analyzer, a sentiment of the response, and the response analyzer being further configured to: in response to determining a negative sentiment of the response from the particular user account, transmitting digital content to the particular user account determined to be associated with positive sentiment.

19. The system of claim 16, wherein analyzing the response comprises determining, using the response analyzer, a sentiment of the response, and the response analyzer being further configured to: in response to determining a negative sentiment of the response from the particular user account, updating a digital task list for the particular user account to remove a digital task item.

20. The system of claim 16, the inquiry controller further configured to determine whether timing criteria have been met for sending the inquiry to the particular user account based at least in part on a calendar entry for the particular user account.

* * * * *